Dec. 9, 1969    F. W. SEYBOLD    3,482,473
ONE-HALF REVOLUTION INDEXING MECHANISM
Filed March 24, 1969    4 Sheets-Sheet 1

INVENTOR.
Frederick W. Seybold

Dec. 9, 1969  F. W. SEYBOLD  3,482,473
ONE-HALF REVOLUTION INDEXING MECHANISM
Filed March 24, 1969  4 Sheets-Sheet 2

DIAGRAM OF FORCES

CD – 2
BD – 5
AD – 9
AB – 14
CQ – 7
CG – $r_1$
AQ – $r$
BH – $f_b$
EH – $F_B$
AE – $f_A$
DE – $F_D$
DH – $F_A$

INVENTOR.
Frederick W. Seybold

Dec. 9, 1969    F. W. SEYBOLD    3,482,473
ONE-HALF REVOLUTION INDEXING MECHANISM
Filed March 24, 1969    4 Sheets-Sheet 3
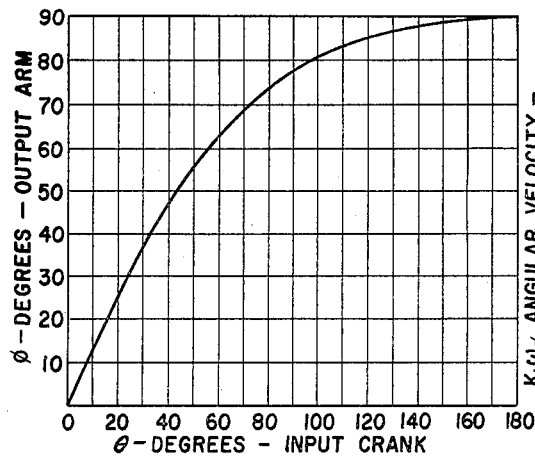
Fig.5
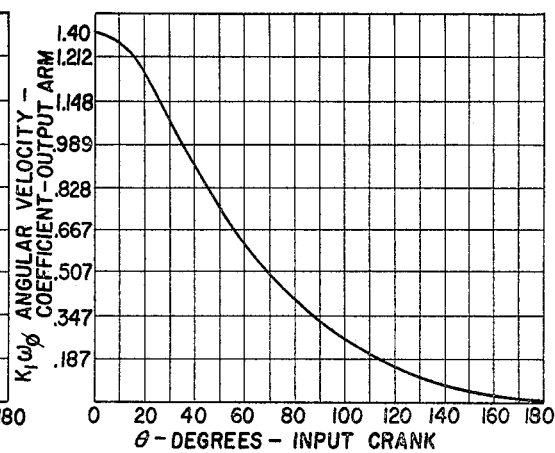
Fig.6
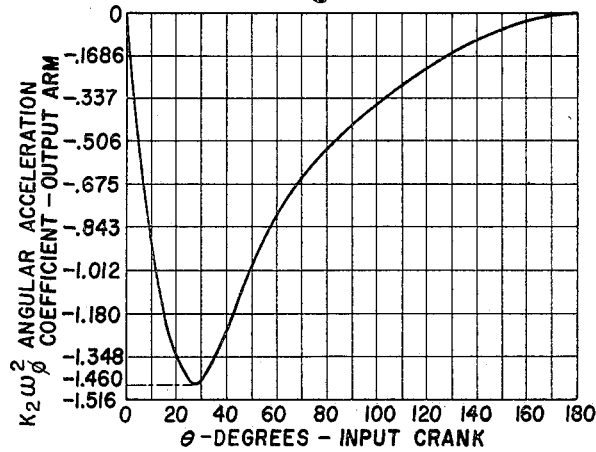
Fig.7
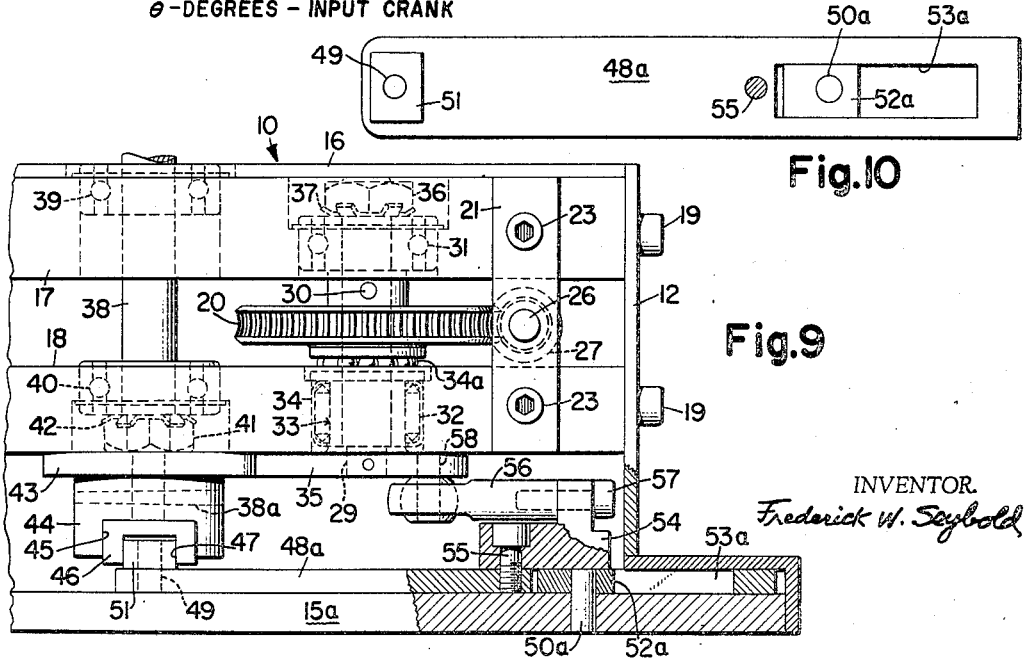
Fig.10
Fig.9
INVENTOR.
Frederick W. Seybold $(a+d)^2 = 5^2 - (2\sin\theta)^2$ $\dfrac{a+d}{5} = \dfrac{\sqrt{25-4\sin^2\theta}}{5} = \dfrac{\sqrt{21+4\cos^2\theta}}{5} = \dfrac{d+7+x}{14}$ $d = \sqrt{21+4\cos^2\theta} - 2\cos\theta$ $\sin^2\theta = 1 - \cos^2\theta$ $4\sin^2\theta = 4 - 4\cos^2\theta$ $-4\sin^2\theta = -4 + 4\cos^2\theta$ $\dfrac{\sqrt{21+4\cos^2\theta}}{5} = \dfrac{\sqrt{21+4\cos^2\theta} - 2\cos\theta + 7 + x}{14}$ $14\sqrt{21+4\cos^2\theta} = 5\sqrt{21+4\cos^2\theta} - 10\cos\theta + 35 + 5x$ $5x = 9\sqrt{21+4\cos^2\theta} + 10\cos\theta - 35$ $\dfrac{y}{14} = \dfrac{2\sin\theta}{5}$ $5y = 28\sin\theta$ $\tan\phi = \dfrac{5y}{5x} = \dfrac{28\sin\theta}{9\sqrt{21+4\cos^2\theta} + 10\cos\theta - 35}$ $\phi = \arctan\dfrac{28\sin\theta}{9\sqrt{21+4\cos^2\theta} + 10\cos\theta - 35} = \dfrac{28\sin\theta}{\text{ITEM 3}}$ ITEM 1 $= \sqrt{21+4\cos^2\theta}$ ITEM 2 $= 9 \times$ ITEM 1 $+ 10\cos\theta$

ITEM 3 $= -35 +$ ITEM 2

ITEM 4 $= ($ITEM 3$)^2 + (28\sin\theta)^2$ $($ITEM 4$)^2 = \left[($ITEM 3$)^2 + 784\sin^2\theta\right]^2$ ITEM 5 $= \dfrac{-8\sin\theta\cos\theta}{2\sqrt{21+4\cos^2\theta}} = \dfrac{-4\sin\theta\cos\theta}{\text{ITEM 1}}$ ITEM 6 $= 2\sin\theta\cos^2\theta$ ITEM 7 $=$ ITEM 6 $- \sin^3\theta$ ITEM 8 $= \sin^2\theta\cos\theta$ $\omega_\phi = \dfrac{252\cos\theta\sqrt{21+4\cos^2\theta} - 980\cos\theta + 280 + \sqrt{21+4\cos^2\theta}}{(9\sqrt{21+4\cos^2\theta} + 10\cos\theta - 35)^2 + 784\sin^2\theta} \cdot \dfrac{1008\sin^2\theta\cos\theta}{} \; \omega_\theta = \dfrac{\text{ITEM 9}}{\text{ITEM 4}} \omega_\theta$ $($ITEM 4$) \times (-252\sin\theta \times$ ITEM 1 $+ 252\cos\theta \times$ ITEM 5 $+ 980\sin\theta +$ ITEM 1 $\times [1008 \times$ ITEM 7 $- ($ITEM 8 $\times$ ITEM 5$)]$ $\alpha_\phi = \dfrac{-($ITEM 9$) \times \left[20\,($ITEM 3$) \times \dfrac{3.6\sin\theta\cos\theta}{\text{ITEM 1}} - \sin\theta\right] + 1568\sin\theta\cos\theta}{($ITEM 4$)^2} \; \omega_\theta^2$

Fig. 8

INVENTOR.
Frederick W. Seybold

3,482,473
ONE-HALF REVOLUTION INDEXING MECHANISM
Frederick W. Seybold, 1979 Dogwood Drive,
Scotch Plains, N.J. 07070
Filed Mar. 24, 1969, Ser. No. 809,569
Int. Cl. B23q 17/02
U.S. Cl. 74—822                                14 Claims

ABSTRACT OF THE DISCLOSURE

This invention provides an indexing mechanism wherein the output member makes one-half revolution for each complete revolution of the driving input shaft, i.e. the member to be indexed makes two stops during a single indexing revolution.

---

This invention pertains to a novel indexing mechanism which makes tow stops for each one revolution of the output member which is to be indexed. The well-known Geneva indexing mechanism is limited to three stops per index of the driven member, which in this instance has only three stations and this accounts for the unfavorable kinematic conditions whereby a very large angular acceleration and a high angular velocity are produced.

A 4-slot Geneva with speed-up gearing has also been used to produce two-stop indexing, but this method results in doubling the maximum acceleration and the maximum velocity of the output member which would necessarily limit the indexing speed.

There are a few two-step indexing devices on the market, but these are cam operated, which require greater input angles for indexing.

Another available type is the star wheel mechanism which does not have the restrictions imposed on the standard Geneva mechanism.

It is, therefore, a primary object of this invention to provide an indexing mechanism having two stops per index cycle of the driven member and wherein a very much reduced maximum angular acceleration and maximum angular velocity are realized.

A further object of this invention is to obtain thru the arrangement of this mechanism "zero" acceleration at the beginning of the cycle and "zero" deceleration at the termination of the cycle. In Geneva index drives the driving roller is subjected to a considerable force at its entrance into the slot and at its exit from the slot.

A still further object of this invention is attained by the continuous engagement of the driving element with the driven member. In Genevas the driving roller disengages from one slot of the driven member and then re-engages with another slot thereof, whereby considerable shock may be experienced.

Indexing is the primary function of this invention, another suitable application of this mechanism is its use as a transmission for driving the type of elevator disclosed in my Patent No. 3,420,116 wherein a one-half revolution per cycle is required as stated in column 6, line 55 of this patent.

A further application of this new mechanism would be the drive for a conveyor where a slow-down and a momentary stop of the conveyor is desirable for performing work on material travelling on the conveyor or for the convenience of loading material thereon or unloading it therefrom.

The application and its design of this invention may very considerably, therefore, a small model was built which incorporates all the essential features and advantages of the invention for the purpose of illustrating and describing this invention in connection with the accompanying drawings in which:

FIGURE 5 shows the angular values of the output member for the relative angular values of the input crank;

FIGURE 6 shows the angular velocity coefficient of the output member relative to the angular values of the driving crank;

FIGURE 7 shows the angular acceleration coefficient of the output member for relative angular values of the driving crank;

FIGURE 8 shows the derivation of mathematical formulae for computing the angular values, the angular velocity and the angular acceleration of the output member;

FIGURE 9 is a sectional view similar to FIGURE 1 and in which the swinging block linkage is used;

FIGURE 10 is a detail view of the slotted connecting bar used on the swinging block linkage.

GENERAL ARRANGEMENT

Figure 1:
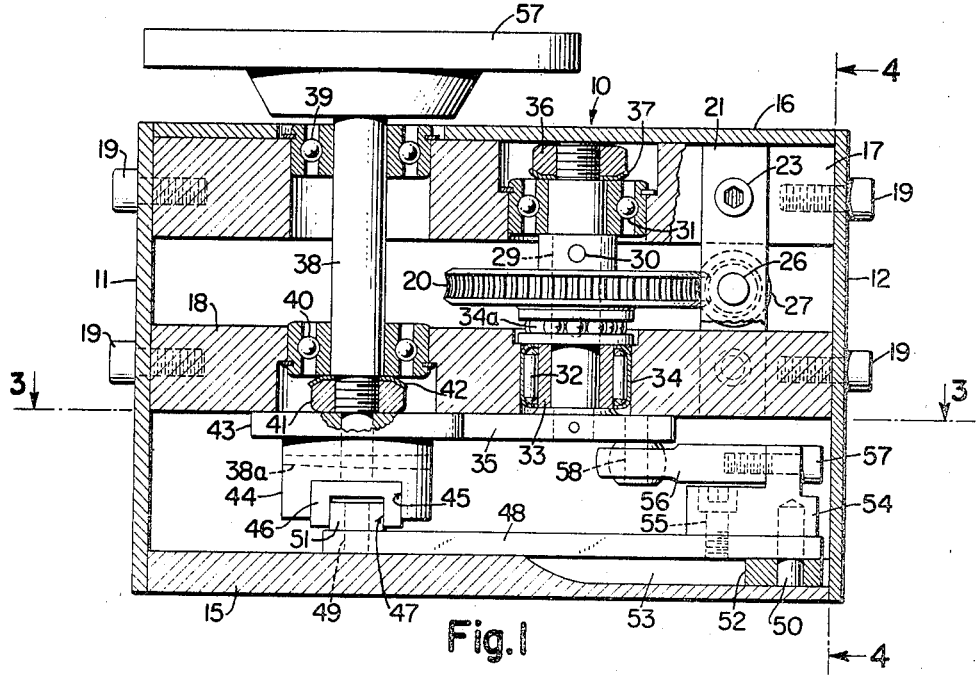
FIGURE 1 is a sectional view taken on line 2—2 of FIGURE 2 in which the sliding block linkage is used.
Figure 3:
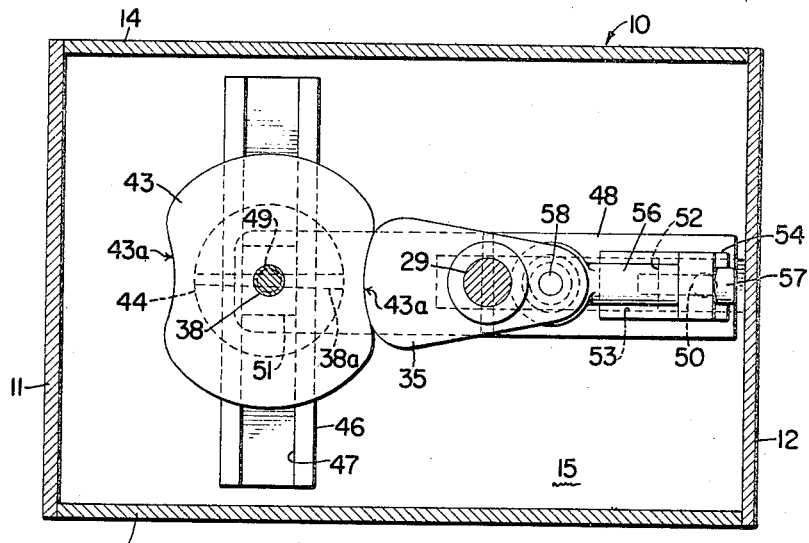
FIGURE 3 is a view taken on line 3—3 of FIGURE 1.
Figure 2:
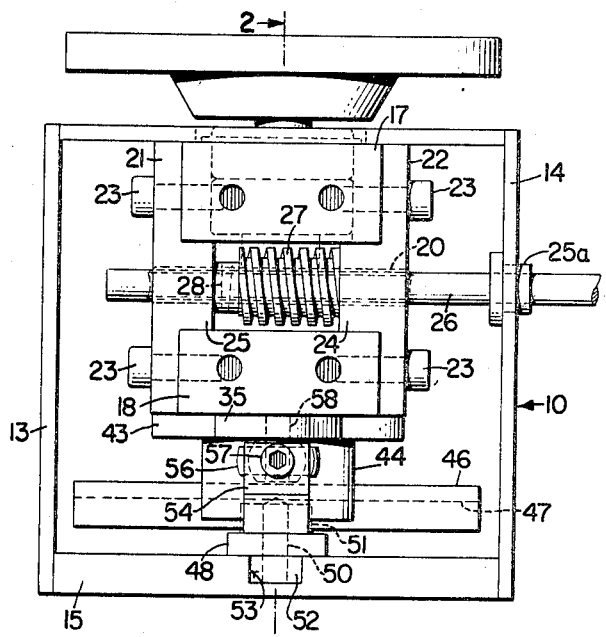
FIGURE 2 is a view taken on line 4—4 of FIGURE 1.

The structural elements comprising the indexing mechanism are mounted in a rectangular, four-sided frame which is supported on a bottom plate. Two support members or braces are placed between the vertical sides of this frame and on these spaced supports the input or drive shaft and the output or indexing shaft are journalled. The input shaft is driven by a worm wheel secured thereto and the latter is driven by a worm fast on a shaft which is rotatably supported on bearings mounted on the upper brace.

A crank disc which is provided with a crank pin is secured to the input shaft, and a grooved arm and a two-lobed cam are fastened to the indexing shaft.

A connecting bar is in sliding contact with the bottom plate and this bar is provided with two pins which are fastened therein and each pin serves as the fulcrum of a crosshead block, one of which slides in a suitable groove in the bottom plate and the other block slides in the grooved arm on the output shaft.

In an alternate construction the connecting bar has only one pin which serves as the fulcrum of the crosshead block which slides in the grooved arm, and the other end of the connecting bar is provided with a suitable slot for moving over a block which is pivoted on a pin secured to the bottom plate.

A connecting block and link are secured to the connecting bar and the link is hinged on the crank pin of the crank disc, the latter also serving as a lock for the two-lobed cam on the indexing shaft.

The output shaft may have mounted thereon various types of machine elements, such as a disc, sprocket, gear, cam or lever, and the entire device may be mounted in various positions other than that shown on the drawings.

In FIGURES 1, 2, 3 and 9 the structural frame 10 comprises vertical side plates 11, 12, 13 and 14, a bottom plate 15 (15a on FIGURE 9) and a top plate 16. Cross-supports 17 and 18 are fastened by means of screws 19 to side plates 11 and 12 and they are spaced a suitable distance apart to provide for the mounting of the worm wheel 20. Brackets 21 and 22 are secured to the cross-supports by the screws 23 and they provide bearings 24 and 25 for the drive shaft 26 to which the worm 27 is fastened by the pin 28. An additional support bearing 25a is held in the side plate 14. The worm 27 meshes with the worm wheel 20 which is secured to the crankshaft 29 by the taper pin 30. The crankshaft 29 is journalled at its upper end on a snap ring ball bearing 31 which is held in the upper cross-support 17 and at its lower end the shaft runs in a needle bearing 32 which is held in the lower cross-support 18. Bearing 32 comprises an inner race 33, which is shrunk onto the crankshaft, and an outer race 34 which confines the needles. A crank disc 35 is secured to the lower end of crankshaft 29 and by means of the adjusting nut 36 and lock washer 37 the endplay between the crank disc and the cross-support 18 is held to a minimum. A thrust bearing 34a is located between the worm wheel 20 and the lower cross-support 18 to transfer the downward thrust of the wheel to the support 18.

The output or indexing shaft 38 is journalled on snap ring ball bearings 39 and 40, respectively held in bores of the upper support 17 and the lower support 18. An adjusting nut 41 and a block washer 42 positions the ball bearing for a minimum of end play. The two-lobed cam 43 has a long hub 44 and it is secured to the indexing shaft 38 by taper pin 38a. Hub 44 is provided with a deep slot 45 into which the indexing arm 46 is fitted, the latter having a long, deep groove 47. Near the ends of the connecting bar 48 the pins 49 and 50 are protruding therefrom and each pin carries a block 51 and 52 respectively. Block 51 slides in the groove 47 of the arm 46, while the block 52 slides in the guide 53 of the bottom plate 15. The connecting bar 48 is also in sliding contact with the bottom plate 15.

Figure 4:
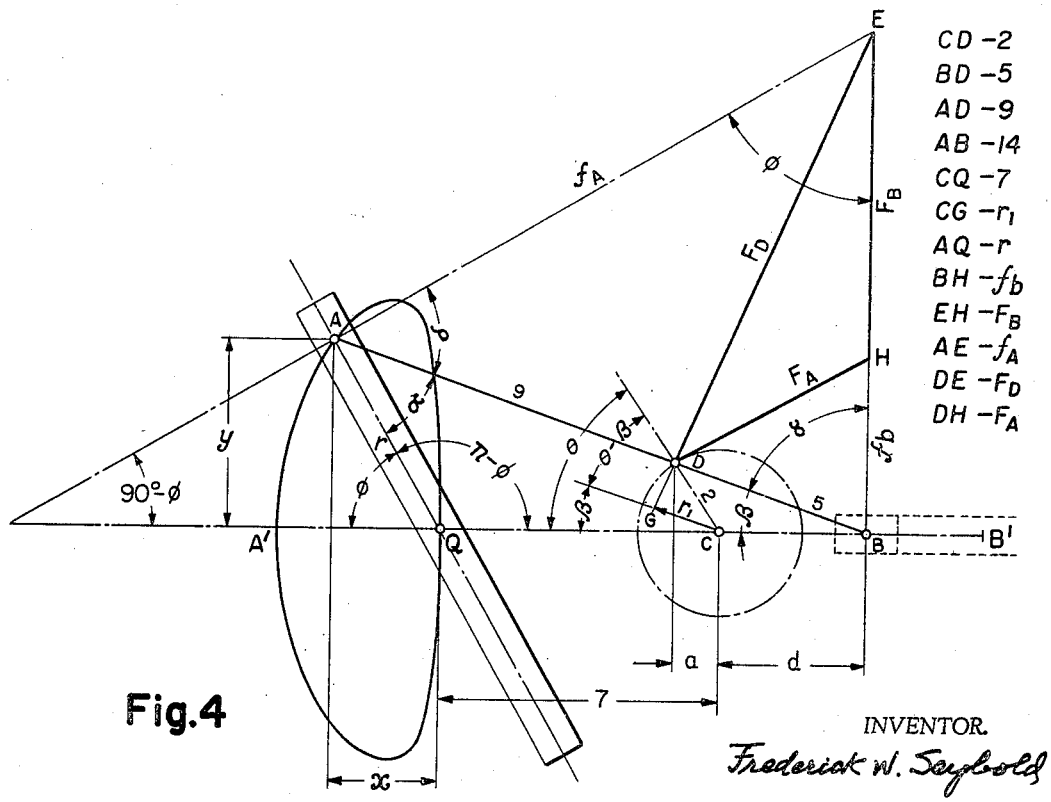
FIGURE 4 is a diagram of the various forces co-acting in the mechanism and having the proportions of its components and center distances indicated thereon.

The cam 43 is shaped to permit the crank disc 35 to enter into the depression 43a, whereby rotation of the indexing shaft 38 is prevented, otherwise, when pin 49 and block 51 pass thru the point Q on FIGURE 4 the arm 46 of the indexing shaft 38 could rotate freely.

A block 54 is located on the pin 50 and is secured to the bar 48 by means of the screw 55. A ball socket rod 56 is fastened to block 54 by the screw 57. The bore of the socket rod 56 is hinged on the crankpin 58 of the crank disc 35.

In the arrangement shown in FIGURE 9 the pin 50 of FIGURE 1 is replaced by a guide slot 53a in the connecting bar 48a to receive the crosshead block 52a, which is fulcrumed on pin 50a, the latter being secured in the bottom plate 15a on which the guide slot 53 of FIGURE 1 is omitted.

In kinematics the arrangement of the linkage shown in FIGURE 9 is said to be an inversion of the arrangement shown in FIGURE 1, however, the relative motion of the components has not been altered.

The geometrical proportions of the indexing mechanism is important in order that it will function as intended.

In FIGURE 4 the member AB represents the connecting bar 48 which is 14 units long, pin 49 to pin 50. The point D, pin 58, on bar AB is 5 units from point B, pin 50, hence AD is 9 units. The crank length CD is 2 units.

Point C (29) to point Q (38) is 7 units, which represents the center distance between the crankshaft 29 and the indexing shaft 38.

It should also be noted that in the device just described the blocks 51 and 52 are in continuous engagement with their respective guides 47 and 53, and in this respect this indexing mechanism differs from the Geneva or the star wheel indexing mechanisms, as in them the driving member engages and disengages from the driven member during each cycle.

Furthermore, the output member of the instant invention rotates in the same direction as the input member, whereas the opposite rotation occurs in the external Geneva mechanism.

OPERATION

As the crank CD rotates the connecting bar 48 oscillates on B' (50), which slides along guide 53 to point B' and point A describes a conchoidal path QAA'Q, whereby an approximately straight line passes thru the point Q, which is the center of rotation of the indexing shaft 38.

The curve shown in FIGURE 5 is the displacement of the output member relative to the position of the driving crank. The angular velocity curve, FIGURE 6, of the output member indicates a maximum angular velocity of 1.4 times the angular velocity of the driving crank, and FIGURE 7 shows the angular acceleration curve having a maximum value of 1.46 times the angular velocity square of the driving crank, and it should be noted that the angular acceleration is "zero" at the beginning and the termination of the indexing movement. These curves were plotted by a computer programmed from the equations shown on FIGURE 8 for crank angle intervals of 5 degrees, from 0 to 180 degrees or one-half cycle.

The design of the indexing mechanism has been clearly described and illustrated, therefore, it will become obvious to those skilled in the art that various modifications, rearrangements and minor improvements can be made.

The proportions of the components may, of course, be changed within limits from those stated on FIGURE 4, and such changes and modifications and rearrangements shall come within the scope of the following claims.

I claim:
1. An indexing mechanism actuated by a crank driven linkage and comprising in combination:
   (a) a frame having upper and lower, spaced supports provided with suitable bearings to receive shafts,
   (b) a bottom plate connected to said frame,
   (c) a crankshaft journalled in some of the bearings held in said supports,
   (d) a crank disc secured to one end of said crankshaft,
   (e) a pin secured in said crank disc, forming a crank,
   (f) a link slideable over said bottom plate,
   (g) a connecting block secured to one end of said link, said block being fulcrumed on the pin of said crank disc,
   (h) means to guide the one end of said link,
   (i) a first pin secured to the other end of said link which extends beyond the pin of said crank disc, said pin tracing a conchoidal path when said crank disc rotates,
   (j) an indexing shaft journalled in others of said bearings held in said spaced supports and parallel to said crankshaft and located at the intersection of said conchoidal path with a centerline passing thru the crankshaft turning point and said guide means,
   (k) a guide arm secured to said indexing shaft, and
   (l) a block pivoted on said first pin and movable in said guide arm.
2. An indexing mechanism as set forth in claim 1, including in addition a two-lobed cam secured to the indexing shaft, said cam being shaped to interlock with the crank disc, whereby indexing shaft is positively held when the first pin on the link passes thru the turning point of said indexing shaft.
3. An indexing mechanism actuated by a sliding block linkage and comprising in combination:
   (a) a frame having upper and lower, spaced supports provided with suitable bearings to receive shafts,
   (b) a bottom plate connected to said frame,
   (c) a crankshaft having a crank disc with a pin secured thereto, said crankshaft being journalled in said spaced supports,
   (d) a crosshead having a second pin,
   (e) a guide in said bottom plate wherein said crosshead slides, said guide being central with said crankshaft,
   (f) a link connecting the pin of said crank disc and said second pin of said crosshead, said link having an extension of suitable length beyond the pin of said crank disc,
   (g) a third pin secured in said extension, said third pin tracing a conchoidal path when said crank disc rotates,

(h) an indexing shaft journalled in bearings held in said spaced supports and parallel to said crankshaft and located at the intersection of said conchoidal path and an extended line thru the turning point of said crankshaft and said crosshead guide, (i) a radial guide arm secured to said indexing shaft and having a deep groove to receive (j) a block fulcrumed on said third pin and slideable in said groove of said radial guide arm, (k) whereby one revolution of said crankshaft compels said guide arm of said indexing shaft to make one-half revolution.

4. An indexing mechanism as set forth in claim 3, including in addition a two-lobed cam secured to said indexing shaft, said cam being shaped to interlock with said crank disc, whereby said indexing shaft is positively held when said third pin in the extension of said link passes thru the turning point of said indexing shaft.

5. An indexing mechanism actuated by a swinging block linkage and comprising in combination:

(a) a frame having upper and lower, spaced supports provided with suitable bearings to receive shafts, (b) a bottom plate connected to said frame, (c) a crankshaft having a crank disc with a pin secured thereto, said crankshaft being journalled in some of the bearings provided in said supports, (d) a second pin secured in said bottom plate and located a suitable distance from said crankshaft and parallel thereto, (e) a crosshead fulcrumed on said second pin, (f) a link fulcrumed on the pin of said crank disc and having a longitudinal slot wherein said crosshead may slide, and an extension of suitable length beyond the pin of said crank disc, (g) a third pin secured in said extenison, said third pin tracing a conchoidal path when said crank disc rotates, (h) an indexing shaft journalled in others of the bearings held in said supports and parallel to said crankshaft and located at the intersection of said conchoidal path and an extended line drawn thru the turning point of said crankshaft and said second pin, (i) a radial guide arm secured to said indexing shaft and having a deep groove to receive (j) a block fulcrumed on said third pin and slideable in said groove of radial arm, (k) whereby one revolution of said crankshaft compels said guide arm to make one-half revolution in the same direction as said crankshaft.

6. An indexing mechanism as set forth in claim 5, including in addition a two-lobed cam secured to said indexing shaft, said cam being shaped to interlock with said crank disc, whereby said indexing shaft is positively held when said third pin in the extension of said link passes thru the turning point of said indexing shaft.

7. An indexing mechanism actuated by a sliding block linkage and comprising in combination:

(a) a frame having upper and lower, spaced supports provided with suitable bearings to receive shafts, (b) a bottom plate connected to said frame, (c) other bearings secured in said upper support and frame, (d) a drive shaft journalled in said other bearings, (e) a worm secured to said drive shaft, (f) a crankshaft journalled on some of the bearings held in said supports, (g) a worm wheel secured to said crankshaft and located between said upper and lower supports, said worm wheel meshing with said worm on said drive shaft, (h) a crank disc secured to one end of said crankshaft, (i) a pin secured in said crank disc, forming a crank, (j) a link slideable over said bottom plate, (k) a connecting block secured to one end of said link, said block being fulcrumed on the pin of said crank disc, (l) a guide groove in said bottom plate, having its center line passing thru the turning point of said crankshaft, (m) a first pin secured to one end of said link, (n) a crosshead block pivoted on said first pin and said guide groove, (o) a second pin secured in an extension of said link beyond the pin in said crank disc, said second pin tracing a conchoidal path when said crank disc rotates, (p) an indexing shaft journalled in others of said bearings held in said supports and parallel to said crankshaft and located at the intersection of said conchoidal path and the center line of said guide groove in said bottom plate, (q) a radial guide arm secured to said indexing shaft and having a deep groove to receive (r) a block fulcrumed on said second pin and slideable in said groove of said radial arm, (s) whereby one revolution of said crankshaft compels said guide arm to make one-half revolution.

8. An indexing mechanism as set forth in claim 7, including in addition a two-lobed cam secured to said indexing shaft, said cam being shaped to interlock with said crank disc, wereby said indexing shaft is positively held when said second pin passes thru the turning point of said indexing shaft.

9. An indexing mechanism actuated by a swinging block linkage and comprising in combination:

(a) a frame having upper and lower, spaced supports provided with suitable bearings to receive shafts, (b) a bottom plate connected to said frame, (c) other bearings secured to said upper support and frame, (d) a drive shaft journalled in said other bearings, (e) a worm secured to said drive shaft, (f) a crankshaft journalled on some of the bearings held in said spaced supports, (g) a worm wheel secured to said crankshaft and located between said upper and lower supports, said worm wheel meshing with said worm on said drive shaft, (h) a crank disc secured to one end of said crankshaft, (i) a pin secured in said crank disc, forming a crank, (j) a link slideable over said bottom plate, said link having a longitudinal slot therein, (k) a connecting block secured to one of said link, said block being fulcrumed on the pin of said crank disc, (l) a first pin secured in said bottom plate, being parallel to the crankshaft, (m) a block pivoted on said first pin and slideable in said longitudinal slot, (n) a second pin secured in an extension of said link beyond the pin in said crank disc, said second pin tracing a conchoidal path when said crank disc rotates, (o) an indexing shaft journalled in others of said bearings held in said supports and parallel to said crankshaft and located at the intersection of said conchoidal path and an extended line drawn thru the turning point of said crankshaft and said first pin, (p) a radial guide arm secured to said indexing shaft and having a deep groove to receive (q) a block fulcrumed on said second pin and slideable in said groove of said radial arm, (r) whereby one revolution of said crankshaft compels said guide arm to make one-half revolution.

10. An indexing mechanism as set forth in claim 9, including in addition a two-lobed cam secured to said indexing shaft, said cam being shaped to interlock with said crank disc, whereby said indexing shaft is positively held when said second pin passes thru the turning point of said indexing shaft.

11. An indexing mechanism actuated by a sliding block linkage and comprising in combination:
  (a) a frame having upper and lower, spaced supports provided with suitable bearings to receive shafts,
  (b) a bottom plate connected to said frame,
  (c) other bearings secured in said upper support and frame,
  (d) a drive shaft journalled in said other bearings,
  (e) a worm secured to said drive shaft,
  (f) a crankshaft journalled on some of the bearings held in said supports,
  (g) a worm wheel secured to said crankshaft and located between said upper and lower supports, said worm wheel meshing with said worm on said drive shaft,
  (h) a crank disc secured to one end of said crankshaft,
  (i) a pin secured in said crank disc, forming a crank,
  (j) a link slideable over said bottom plate,
  (k) a connecting block secured to one end of said link, said block being fulcrumed on the pin of said crank disc,
  (l) a guide groove in said bottom plate, having its centerline passing thru the turning point of said crankshaft,
  (m) a first pin secured to the one end of said link and located 2½ times said crank length from the pin of said crank disc,
  (n) a crosshead block pivoted on said first pin and slideable in said guide groove,
  (o) a second pin secured in an extension of said link beyond the pin in said crank disc and located 7 times said crank length from said first pin, said second pin tracing a conchoidal path when said crank disc rotates,
  (p) an indexing shaft journalled in others of said bearings held in said supports and parallel to said crank shaft and located at the intersection of said conchoidal path and the center line of said guide groove in said bottom plate,
  (q) a radial guide arm secured to said indexing shaft and having a deep channel to receive
  (r) a block fulcrumed on said second pin and slideable in said channel of said radial arm,
  (s) whereby the acceleration of the indexing shaft has a value of "zero" at the beginning and the termination of its cyclic motion.

12. An indexing mechanism as set forth in claim 11, including in addition a two-lobed cam secured to said indexing shaft, said cam being shaped to interlock with said crank disc, whereby said indexing shaft is positively held when said second pin passes thru the turning point of said indexing shaft.

13. An indexing mechanism actuated by a swinging block linkage comprising in combination:
  (a) a frame having upper and lower, spaced supports provided with suitable bearings to receive shafts,
  (b) a bottom plate connected to said frame,
  (c) other bearings secured to said upper support and frame,
  (d) a drive shaft journalled in said other bearings,
  (e) a worm secured to said drive shaft,
  (f) a crankshaft journalled on some of the bearings held in said spaced supports,
  (g) a worm wheel secured to said crankshaft and located between said upper and lower supports, said worm wheel meshing with said worm on said drive shaft,
  (h) a crank disc secured to one end of said crankshaft,
  (i) a pin secured in said crank disc, forming a crank,
  (j) a link slideable over said bottom plate, said link having a longitudinal slot therein,
  (k) a connecting block secured to one end of said link, said block being fulcrumed on the pin of said crank disc,
  (l) a first pin secured in said bottom plate, being parallel to the crankshaft and located 3 times said crank length from the turning point of said crankshaft,
  (m) a block pivoted on said first pin and slideable in said longitudinal slot,
  (n) a second pin secured in an extension of said link beyond the pin in said crank disc and located 4 times said crank length from the pin in said crank disc, said second pin tracing a conchoidal path when said crank disc rotates,
  (o) an indexing shaft journalled in others of the bearings held in said supports and parallel to said crankshaft and located at the intersection of said conchoidal path and an extended line thru the turning point of said crankshaft and said first pin,
  (p) a radial guide arm secured to said indexing shaft and having a deep channel to receive
  (q) a block fulcrumed on said second pin and slideable in said channel of said radial arm,
  (r) whereby the acceleration of the indexing shaft has a value of "zero" at the beginning and the termination of its cyclic motion.

14. An indexing mechanism as set forth in claim 13, including in addition a two-lobed cam secured to said indexing shaft, said cam being shaped to interlock with said crank disc, whereby said indexing shaft is positively held when said second pin passes thru the turning point of said indexing shaft.

References Cited
UNITED STATES PATENTS 2,784,612   3/1957   Liska _____ 74—827 XR
2,898,775   8/1959   Reid _____ 74—435

FRED C. MATTERN, JR., Primary Examiner

F. D. SHOEMAKER, Assistant Examiner

U.S. Cl. X.R.

74—827